(12) United States Patent
Savatsky et al.

(10) Patent No.: US 6,867,270 B2
(45) Date of Patent: Mar. 15, 2005

(54) PROCESS FOR TRANSITIONING BETWEEN INCOMPATIBLE CATALYSTS USING A SUBSTANTIALLY CONTAMINANT FREE SEEDBED

(75) Inventors: Bruce Jon Savatsky, Kingwood, TX (US); Kelli Lynne Tilston, Katy, TX (US); Thomas Redden Veariel, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/720,511

(22) Filed: Nov. 24, 2003

(65) Prior Publication Data

US 2004/0167299 A1 Aug. 26, 2004

Related U.S. Application Data

(60) Provisional application No. 60/437,696, filed on Dec. 31, 2002.

(51) Int. Cl.$^7$ ................................................. C08F 2/38
(52) U.S. Cl. ............................. 526/82; 526/84; 526/90; 526/901
(58) Field of Search ............................. 526/82, 84, 90, 526/901

(56) References Cited

U.S. PATENT DOCUMENTS

| | | | |
|---|---|---|---|
| 4,243,619 A | 1/1981 | Fraser et al. ............... | 264/40.6 |
| 4,543,399 A | 9/1985 | Jenkins, III et al. .......... | 526/70 |
| 4,588,790 A | 5/1986 | Jenkins, III et al. .......... | 526/70 |
| 5,352,749 A | 10/1994 | DeChillis et al. ............. | 526/68 |
| 5,405,922 A | 4/1995 | DeChillis et al. ............. | 526/68 |
| 5,436,304 A | 7/1995 | Griffin et al. ................. | 526/68 |
| 5,442,019 A | 8/1995 | Agapiou et al. .............. | 526/82 |
| 5,462,999 A | 10/1995 | Griffin et al. ................. | 526/68 |
| 5,672,665 A | 9/1997 | Agapiou et al. .............. | 526/82 |
| 5,672,666 A * | 9/1997 | Muhle et al. ................. | 526/82 |
| 5,747,612 A | 5/1998 | Agapiou et al. .............. | 526/82 |
| 5,753,786 A | 5/1998 | Agapiou et al. .............. | 526/82 |
| 6,218,484 B1 | 4/2001 | Brown et al. ................. | 526/68 |

FOREIGN PATENT DOCUMENTS

WO    WO 00/58377    10/2000

OTHER PUBLICATIONS

U.S. Appl. No. 10/683,711 filed Oct. 10, 2003.

* cited by examiner

*Primary Examiner*—William K. Cheung (57) ABSTRACT

The present invention is a process for transitioning from a first polymerization reaction to a second polymerization reaction incompatible with the first polymerization reaction in a gas-phase reactor. The novel process comprises conducting multiple polymerization reactions, capturing and storing a substantially contaminant-free polymerization product from each multiple polymerization reaction for use as a selected substantially contaminant-free seedbed in a second polymerization, wherein the polymerization product from each multiple polymerization reaction is rendered substantially contaminant-free by stripping or venting reactants and contaminants and is maintained as substantially contaminant-free by storage under an inert atmosphere.

18 Claims, 3 Drawing Sheets

PROCESS FOR TRANSITIONING BETWEEN INCOMPATIBLE CATALYSTS USING A SUBSTANTIALLY CONTAMINANT FREE SEEDBED

CROSS REFERENCE TO RELATED APPLICATION

The present application claims priority to provisional patent application U.S. Ser. No. 60/437,696 filed on Dec. 31, 2002.

FIELD OF THE INVENTION

The present invention is directed generally to a method for transitioning in a gas-phase reactor from a first polymerization reaction to a second polymerization reaction incompatible with the first polymerization reaction. In particular, the method provides conducting multiple polymerizations to form multiple substantially contaminant-free seed beds and storing the beds under an inert atmosphere to maintain them as substantially contaminant-free and then conducting a first polymerization reaction and removing substantially all the contents from the first polymerization reaction without introducing contaminants into the reactor, followed by adding a select compatible substantially contaminant-free seed bed and other components for a second polymerization reaction into the reactor, without introducing contaminants and without purging the reactor, and conducting the second polymerization reaction.

BACKGROUND

Gas-phase processes for the homopolymerization and copolymerization of monomers, especially olefin monomers, are well known in the art. Such processes can be conducted, for example, by introducing the gaseous monomer or monomers into a stirred and/or fluidized bed of resin particles and catalyst.

In the fluidized-bed polymerization of olefins, the polymerization is conducted in a fluidized-bed reactor, wherein a bed of polymer particles is maintained in a fluidized state by means of an ascending gas stream including gaseous reaction monomer. The polymerization of olefins in a stirred-bed reactor differs from polymerization in a gas fluidized-bed reactor by the action of a mechanical stirrer within the reaction zone, which contributes to fluidization of the bed. As used herein, the term "gas-phase reactor" will include fluidized-bed and stirred-bed reactors.

The start-up of a gas-phase reactor generally uses a bed of pre-formed polymer particles, i.e. a "seedbed." After polymerization is initiated, the seedbed is sometimes referred to as a "reactor bed."

The reactor bed includes a bed of polymer particles, catalyst(s), reactants and inert gases. This reaction mixture is maintained in a fluidized condition by the continuous upward flow of a fluidizing gas stream from the base of the reactor which includes recycle gas stream circulated from the top of the reactor, together with added make-up reactants and inert gases. A distributor plate is typically positioned in the lower portion of the reactor to help distribute the fluidizing gas to the reactor bed, and also to act as a support for the reactor bed when the supply of recycle gas is cut off. As fresh polymer is produced, polymer product is withdrawn to substantially maintain the height of the reactor bed. Product withdrawal is generally via one or more discharge outlets disposed in the lower portion of the reactor, near the distributor plate.

The polymerization process can employ Ziegler-Natta, metallocene or other known polymerization catalysts appropriate for the gas-phase process. A variety of gas phase polymerization processes are known. For example, the recycle stream can be cooled to a temperature below the dew point, resulting in condensing a portion of the recycle stream, as described in U.S. Pat. Nos. 4,543,399 and 4,588,790. This intentional introduction of a liquid into a recycle stream or directly into the reactor during the process is referred to generally as a "condensed mode" operation.

Further details of fluidized bed reactors and their operation are disclosed in, for example, U.S. Pat. Nos. 4,243,619, 4,543,399, 5,352,749, 5,436,304, 5,405,922, 5,462,999, and 6,218,484, the disclosures of which are incorporated herein by reference.

Sometimes during the production of olefin polymers in a commercial reactor, it is desirable or necessary to transition from one type of catalyst system producing polymers having certain properties and characteristics to another catalyst system capable of producing polymers of different chemical and/or physical attributes. Transitioning between compatible Ziegler-Natta type catalysts generally takes place easily. However, where the catalysts are incompatible or of different types, the process is typically complicated. For example, transitioning between a traditional Ziegler-Natta type catalyst and a chromium based catalyst (two incompatible catalysts), it has been found that some of the components of the traditional Ziegler-Natta catalysts or the cocatalyst/activator act as poisons to the chromium based catalyst. Consequently, these poisons inhibit the chromium catalyst from promoting polymerization.

In the past, to accomplish an effective transition between incompatible catalysts, the first catalyzed olefin polymerization process was terminated using various techniques known in the art. Then the reactor was purged and emptied. After a new seedbed was added but before new reactants were added, the reactor would undergo another purging step to remove any contaminants such as catalyst poisons, and water and/or oxygen that may have been introduced when emptying or refilling the reactor. Such decontamination steps are time consuming and costly, sometimes requiring about 4 days or more of reactor shutdown time before polymerization could be re-initiated in a commercial operation.

U.S. Pat. Nos. 5,442,019; 5,672,665; 5,753,786; and 5,747,612, each issued to Agapiou et al., the disclosures of all of which are incorporated herein by reference, have proposed methods for transitioning between two incompatible catalysts without halting the polymerization reaction and emptying the reactor to rid it of the original catalyst by (a) discontinuing the introduction of the first catalyst into the reactor, (b) introducing a catalyst killer, and (c) introducing a second catalyst into the reactor. However, having the polymer product from the first polymerization reaction present during the transition can result in product made from both catalysts, which can provide a final product with less than optimum polymer properties.

Publication document WO00/58377 by Bybee et al. (Bybee) discloses a process for transitioning between two incompatible polymerization catalysts by stopping the first polymerization reaction, removing the polymer in the reactor, purging the reactor with nitrogen, adding a seedbed of polymer particulates to the reactor and polymerizing olefins with a second polymerization catalyst. However, Bybee discloses opening the reactor during the step of removing the polymers from the first polymerization reaction, which allows contaminants such as moisture, air or other potential catalyst poisons to be introduced into the reactor. Moreover, by opening the reactor to atmospheric conditions, a thin layer of oxidized compounds can be formed on the reactor wall that can interfere with subsequent reactor operating continuity. Accordingly, Bybee requires a step of purging the reactor after the introduction of the seedbed to remove oxygen that has been introduced into the reactor. Bybee also discloses a step of adding a drying agent to the seedbed in the reactor to remove moisture that has been introduced as a result of opening the reactor. These purging and drying steps require additional reactor downtime, and equates to lost production and increased costs.

What is needed is a method for transitioning from one catalyst system to another catalyst system that is incompatible with the first catalyst system, with reduced gas-phase reactor down-time. The present invention satisfies this need.

SUMMARY OF THE INVENTION

The invention relates to a process for transitioning from a first catalyst system to a second catalyst system incompatible with the first catalyst system, in a gas-phase polymerization reactor. Broadly, the invention is a process comprising a) terminating a first polymerization reaction; b) emptying the gas-phase reactor of the contents of the first polymerization reaction, while substantially preventing entry of contaminants into the reactor; c) introducing a seedbed into the reactor that is substantially free of contaminants, while substantially preventing entry of contaminants into the reactor; d) introducing a second catalyst system into the reactor, and e) conducting a second polymerization reaction.

In one embodiment, the invention is a process for transitioning from a first polymerization catalyst system to a second polymerization catalyst system incompatible with the first polymerization catalyst system in a gas-phase reactor, comprising a) conducting a first polymerization reaction in the gas-phase reactor using a first polymerization catalyst system and forming a polymerization product, b) forming a seedbed by removing a portion of the product from the first polymerization reaction, purging said removed product with an inert gas and storing said removed product in a container, c) stopping the first polymerization reaction, d) removing the contents of said first polymerization reaction from the gas-phase reactor while maintaining a substantially closed system and essentially concurrently purging the stored seedbed to form a substantially contaminant free seedbed, e) in the substantially closed system, introducing said substantially contaminant free seedbed into the gas-phase reactor after said removing step, f) introducing a second feed system into the gas-phase reactor, g) introducing a second catalyst system into the gas-phase reactor, and h) conducting a second polymerization reaction.

In another embodiment, the invention is a process for transitioning from a first polymerization catalyst system to a second polymerization catalyst system incompatible with the first polymerization catalyst system in a gas-phase reactor, comprising a) conducting a first polymerization reaction in the gas-phase reactor using a first polymerization catalyst system and forming a polymerization product, b) forming a substantially contaminant free seedbed by removing a portion of the product from the first polymerization reaction, purging said removed product with an inert gas in a container and storing said removed product in said container under a blanket of inert gas, c) stopping the first polymerization reaction, d) removing the contents of said first polymerization reaction from the gas-phase reactor while maintaining a substantially closed system, e) in the substantially closed system, introducing said substantially contaminant free seedbed into the gas-phase reactor after said removing step, f) introducing a second feed system into the gas-phase reactor, g) introducing a second catalyst system into the gas-phase reactor, and h) conducting a second polymerization reaction.

In another embodiment, the invention is a A process for transitioning from a first polymerization reaction using a first catalyst system to produce a first polymerization product to a second polymerization reaction producing a second polymerization product wherein the second polymerization reaction is incompatible with the first polymerization catalyst system or first polymerization product in a gas-phase reactor, comprising (a) after the first polymerization reaction, conducting multiple polymerization reactions in the gas-phase reactor using multiple polymerization catalyst systems, multiple reactor conditions and/or multiple feed streams to form multiple polymerization products; (b) forming a substantially contaminant-free seedbed from each polymerization reaction by removing a portion of the polymerization product from each polymerization reaction and stripping or venting reactants and contaminants from each polymerization product; (c) deactivating catalyst species entrained or contained with each polymerization product without contacting the polymerization product with excess deactivator; (d) optionally, after the deactivation step, stripping or venting reactants and contaminants from each polymerization product; (e) storing each substantially contaminant-free seedbed separately in a storage container under dry inert atmosphere to maintain each seed bed as substantially-free of contaminants; (f) stopping each multiple polymerization reaction; (g) removing the contents of each multiple polymerization reaction from the gas-phase reactor while preventing the introduction of additional or substantial contaminants; (h) selecting a stored substantially contaminant-free seedbed that is compatible with the second polymerization reaction in regards to polymerization product or polymerization catalyst system; (i) introducing the selected substantially contaminant-free seedbed into the gas-phase reactor while preventing the introduction of additional or substantial contaminants to the seedbed and reactor; (j) introducing a second feed system into the gas-phase reactor; (k) introducing a second catalyst system into the gas-phase reactor; and (l) conducting the second polymerization reaction.

In another embodiment, the invention is a process for transitioning from a first polymerization catalyst system to a second polymerization catalyst system incompatible with the first polymerization catalyst system in a gas-phase reactor, comprising a) conducting a first polymerization reaction in the gas-phase reactor using a first polymerization catalyst system, b) stopping the first polymerization reaction, c) removing the contents of said first polymerization reaction from the gas-phase reactor while maintaining a substantially closed system, d) obtaining a substantially contaminant free seedbed from a second polymerization reactor, e) in the substantially closed system, introducing said substantially contaminant free seedbed into the gas-phase reactor after said removing step, f) introducing a second feed system into the gas-phase reactor, g) introducing a second catalyst system into the gas-phase reactor, and h) conducting a second polymerization reaction.

DETAILED DESCRIPTION OF THE INVENTION

The invention relates to a process for transitioning from a first catalyst system to a second catalyst system that is incompatible with the first catalyst system, in a gas-phase polymerization reactor. For the purposes of this patent specification and claims, the terms "catalysts" and "catalyst systems" are used interchangeably.

As used herein "compatible catalysts" are those catalysts having similar kinetics of termination and insertion of monomer and comonomer(s) and/or do not detrimentally interact with each other. "Incompatible catalysts" are those that satisfy one or more of the following: 1) those catalysts that in each other's presence reduce the activity of at least one of the catalysts by greater than 50%; 2) those catalysts such that under the same reactive conditions one of the catalysts produces polymers having a molecular weight greater than two times higher than any other catalyst in the system; 3) those catalysts that differ in comonomer incorporation frequency or reactivity ratio under the same conditions by more than about 30%. Detrimental catalyst interactions can lead to poor product quality. For example, in the production of resins that are to be subsequently processed into films, incompatible catalysts or detrimental catalyst interactions can result in high molecular weight species that act or appear as gels in the subsequent film.

While the preferred embodiment of the invention relates to transitioning from a traditional Ziegler-Natta catalyst to a metallocene catalyst, it is within the scope of this invention to transition between any incompatible catalysts. For example, this invention contemplates transitioning between a traditional Ziegler-Natta catalyst and a chromium catalyst; transitioning between a chromium catalyst and a metallocene catalyst; transitioning between a traditional Ziegler-Natta titanium catalyst to a Ziegler-Natta vanadium catalyst; or even transitioning between a traditional Ziegler-Natta catalyst or a chromium catalyst or a metallocene systems and a mixed Ziegler-Natta/metallocene catalyst system and vice-versa. This invention contemplates that the direction of transitioning between incompatible catalysts is not limiting, however, it is preferred that the process of the invention transition from a catalyst incompatible with a metallocene catalyst system.

Traditional Ziegler-Natta catalysts comprise a transition metal halide, such as titanium or vanadium halide, and an organometallic compound of a metal of Group 1, 2 or 3, typically trialkylaluminum compounds, which serve as an activator for the transition metal halide. Some Ziegler-Natta catalyst systems incorporate an internal electron donor that is complexed to the alkyl aluminum or the transition metal. The transition metal halide may be supported on a magnesium halide or complexed thereto. This active Ziegler-Natta catalyst may also be impregnated onto an inorganic support such as silica or alumina. For the purposes of this patent specification, chromocene catalysts, for example, described in U.S. Pat. No. 4,460,755, which is incorporated herein by references, are also considered to be traditional Ziegler-Natta catalysts. For more details on traditional Ziegler-Natta catalysts, see for example, U.S. Pat. Nos. 3,687,920, 4,086,408, 4,376,191, 5,019,633, 4,482,687, 4,101,445, 4,560,671, 4,719,193, 4,755,495, 5,070,055, all of which are herein incorporated by reference.

Metallocene catalysts, for example, are typically those bulky ligand transition metal compounds derivable from the formula:

$$[L]_m M[A]_n$$

where L is a bulky ligand; A is at least one halogen leaving group, M is a transition metal and m and n are such that the total ligand valency corresponds to the transition metal valency. Preferably, the catalyst is four coordinate such that the compound is ionizable to a 1+ valency state.

The ligands L and A may be bridged to each other, and if two ligands L and/or A are present, they may be bridged. The metallocene compound may be full-sandwich compounds having two or more ligands L, which may be cyclopentadienyl ligands or cyclopentadiene derived ligands or half-sandwich compounds having one ligand L, which is a cyclopentadienyl ligand or derived ligand.

The metallocene compounds contain a multiplicity of bonded atoms, preferably carbon atoms, forming a group that can be cyclic. The bulky ligand can be a cyclopentadienyl ligand or cyclopentadienyl derived ligand, which can be mono- or poly-nuclear, or any other ligand capable of $\eta^{-5}$ bonding to the transition metal. One or more bulky ligands may be π-bonded to the transition metal atom. The transition metal atom may be a Group 4, 5 or 6 transition metal and/or a transition metal from the lanthamide and actinide series. Other ligands may be bonded to the transition metal, such as at least one halogen as a leaving group that is detachable from the transition metal. Non-limiting examples of metallocene catalysts and catalyst systems as well as mixed Ziegler-Natta/metallocene catalyst systems are described in, for example, U.S. Pat. Nos. 4,871,705, 4,937,299, 5,017,714, 5,120,867, 5,057,475, 5,096,867, 5,055,438, 5,227,440, 5,153,157, 5,198,401, 5,241,025, 4,530,914, 4,952,716, 5,064,802, 5,124,418, 4,808,561, 4,897,455, as well as in U.S. patent application Ser. Nos. 60/408,430, 60/408,431 and 60/408,480, all of which are herein incorporated by reference. Also, non-limiting examples are described in the disclosures of EP-A-0129,368, EP-A-0520732, EP-A-0277003, EP-A-0277004, EP-A-0420436, WO 91/04257, WO 92/00333, WO 93/08221, and WO 93/08199 are all fully incorporated herein by reference.

The metallocene catalyst may also be supported on support materials known in the art, such as inorganic oxides like silica, alumina or magnesia or polymeric such as polyethylene. The metallocene catalyst or mixed catalysts can be supported on a single support, or the catalyst(s) may separately be supported on one support and an activator on another support.

Figure 1:
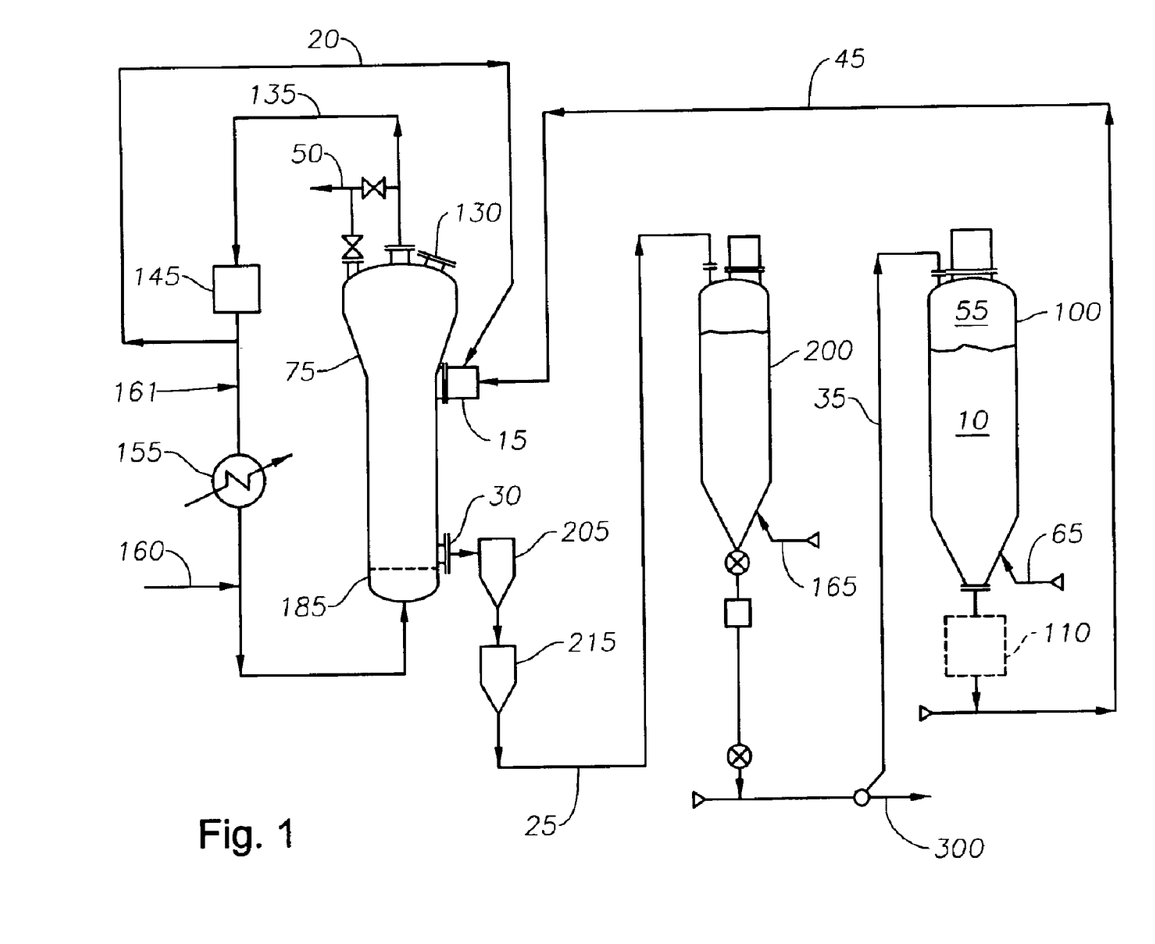
FIG. 1 is a flow diagram of a gas-phase polymerization plant in accordance with an embodiment of this invention.

Referring now to FIG. 1, polymerization is conducted in a gas phase reactor 75. As previously set forth, in gas phase reactors polymerization is conducted in a fluidized bed in which the reaction mixture (comprising a bed of polymer particles, catalyst, reactants and inert gases) is maintained in a fluidized condition by the continuous upward flow of a fluidizing gas stream from the base of the reactor. Cycle gas is taken from the top of the reactor 75 through line 135. The circulating cycle gas is compressed by a compressor 145 and cooled by a heat exchanger 155 before being reintroduced at the base of the reactor 75 as a fluidizing gas stream. The fluidizing gas stream will also contain make-up reactants and inert gases, which can be introduced into line 135 by line 161 and/or line 160. A distributor plate 185 is positioned at the lower end of the reactor to help distribute the fluidizing gas to the reactor bed, and also to act as a support for the reactor bed when the supply of fluidizing or cycle gas is cut off. As fresh polymer is produced, polymer product is withdrawn by one or more discharge outlets 30 disposed in the lower portion of the reactor 75, near the distributor plate 185. The polymer product can be transferred into a product chamber 205 and then into a product blow tank 215 which enables the transfer of the polymer product through transfer line 25 into a product purge bin 200. Nitrogen and steam are injected using a purging system 165 into product purge bin 200 in order to remove reactants and terminate or prevent any continuing polymerization. The polymer product can then be transferred out of the product purge bin 200 to downstream operations 300, which can include extrusion or packaging operations.

To initiate the transition from a first catalyst system to a second catalyst system, the first polymerization reaction should first be terminated. Methods for terminating a polymerization reaction are known in the art. Non-limiting examples include stopping the catalyst feed and allowing the reaction to die off, introducing a catalyst poison to the reactor or adjusting the reactor conditions to stop the polymerization, such as by decreasing the pressure and/or temperature of the reactor below the necessary conditions to sustain polymerization. It is preferred that the polymerization be stopped by introduction of a catalyst poison, or "catalyst killers."

For the purposes of this patent specification, catalyst killers do not include that minor portion of poisons or contaminants that may be contained in the monomer or comonomer feed streams during normal polymerization operations. Catalyst killers include reversible poisons such as, but not limited to, carbon monoxide (CO), carbon dioxide ($CO_2$), internal olefins, 2-butene and the like, internal dienes, 2–4 hexadiene and the like, alkenes and butadienes. Reversible catalyst killers typically initially inhibit catalyst activity and polymerization for a period of time, but do not irreversibly deactivate the catalyst. These reversible catalyst killers can be used in any combination or order of introduction in the process of this invention. Catalyst killers useful in this invention also include irreversible catalyst killers, which irreversibly inactivate a catalyst's ability to polymerize olefins. Such irreversible catalyst killers include, but are not limited to, for example, oxygen, water ($H_2O$), alcohols, glycols, phenols, ethers, carbonyl compounds such as ketones, aldehydes, carboxylic acids, esters, fatty acids, alkynes such as acetylene, amines, nitrites, nitrous compounds, pyridine, pyroles, carbonyl sulfide (COS) and mercaptans. These irreversible catalyst killers can be used in any combination or order of introduction in the process of this invention. Mixtures of one or more reversible catalyst killers and irreversible catalyst killers may also be used, however, one of ordinary skill in the art will recognize that some of these killers could react with each other and are thus better introduced separately.

Referring again to FIG. 1, after the first polymerization reaction is terminated, the contents of the reactor 75 are emptied by continuous or intermittent discharging. The reactor contents include unreacted monomer or comonomer feed, unreacted catalyst, polymerized products, the reactor bed, by-products of the polymerization reaction and catalyst poisons, if any. The manner of removing the contents of the first polymerization reaction is not critical, however, it is required that the removal step be conducted to prevent introduction of additional or substantial contaminants. Accordingly, it is preferred that the reactor 75 be maintained as a substantially closed system through this removal step. As used herein, "contaminants" means air, moisture or other catalyst poisons. As used herein, "substantially closed system" means that the reactor is not exposed to the atmosphere so as to allow additional or substantial contaminants into the reactor.

In a preferred embodiment, the reactor is emptied conventionally through normal product discharges through the discharge outlet 30. During polymerization, as product is formed, product discharges are intermittently taken in order to remove polymer product and maintain the volume of product in the reactor, as previously discussed. After the polymerization reaction has terminated, this same product discharge system can be used to substantially empty the reactor of its contents. Typically, these conventional product discharges can be conducted to remove in excess of about 95% of the reactor contents by volume, preferably greater than 99%, more preferably greater than 99.5%. In another embodiment, an inert gas such as nitrogen can be fed into the reactor 75 to help fluidize the reactor bed to aid in the removal of the reactor contents.

After the contents from the first polymerization reaction are removed, a seedbed is added to the gas-phase reactor in a manner that prevents the introduction of contaminants into the reactor, i.e. while maintaining a substantially closed system. The seedbed itself is substantially free of contaminants upon introduction into the reactor, so that purging the reactor is not required after introduction of the seedbed.

By "substantially free of contaminants" it is meant that the seedbed contain less than 200 parts per million by weight (ppmw) of contaminants, more preferably less than 100 ppmw, and even more preferably 50 ppmw. Contaminant quantities equal to or greater than 200 ppmw are referred to herein as additional or substantial contamination or contaminants. By introducing a substantially contaminant free seedbed into the reactor while maintaining a substantially closed system, the need to purge the reactor will be avoided and the fluidizing gas (under conventional monomer purification operations) will comprise essentially no contaminants or poisons that can adverse affect operability and/or the activity of the second polymerization catalyst. More specifically, polymerizations catalyzed by conventional Ziegler-Natta catalysts, the cycle or fluidizing gas should comprise less than or equal to 20 ppmw water for good operability and catalyst activity and for polymerizations catalyzed by chrome-based or metallocene catalysts, the cycle or fluidizing gas should comprise less than or equal to 10 ppmw water, which can be accomplished by the present invention.

The particular process of obtaining and transferring a substantially contaminant free seedbed to the reactor is not critical to the current invention. However, diagrammatic overviews of several embodiments of obtaining and transferring a substantially contaminant free seedbed to the reactor are shown in FIGS. 2–5.

Figure 2:
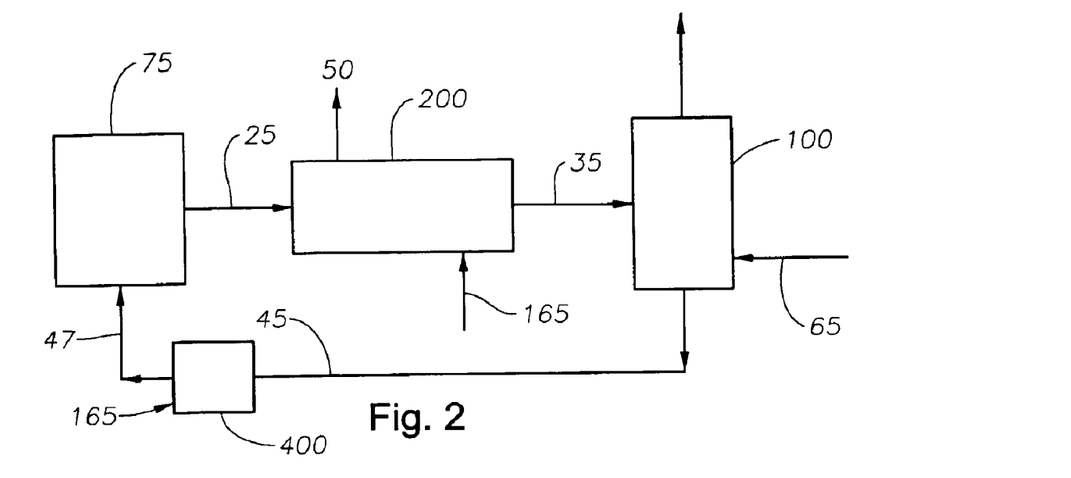
FIG. 2 is a simplified flow diagram that shows a method for obtaining and storing a seedbed in accordance with an embodiment of this invention.

Referring now to FIG. 2, in an embodiment, polymer product is discharged from the reactor 75 during normal operations, and transferred through line 25 to product purge bin 200. The seedbed is purged in product purge bin 200 by an inert gas purge system 165 to deactivate catalyst species and remove reactants, such as a nitrogen and/or a steam purge system. The product is then transferred by transfer line 35 to the seedbed container 100, where the seedbed is stored for subsequent use during a transition to a second polymerization catalyst. When needed, the seedbed can be transferred by way of transfer line 45 to a second product purge bin 400 wherein the seedbed is purged to provide a substantially contaminant free seedbed and then transferred by way of transfer line 47 to the reactor 75. Alternatively, to pre-purge the stored product and form a substantially contaminant free seedbed, rather than purging the stored product using the product purge bin 400, the stored product may be sufficiently purged during direct transfer to the reactor 75 (using, for example, a transfer like transfer line 45 in FIG. 3) by using a dry inert gas (e.g. dry nitrogen) as the transfer or conveyance medium or, as other alternative, by using product purge bin 200 wherein in either case product purge bin 400 is bypassed by appropriate piping.

Figure 3:
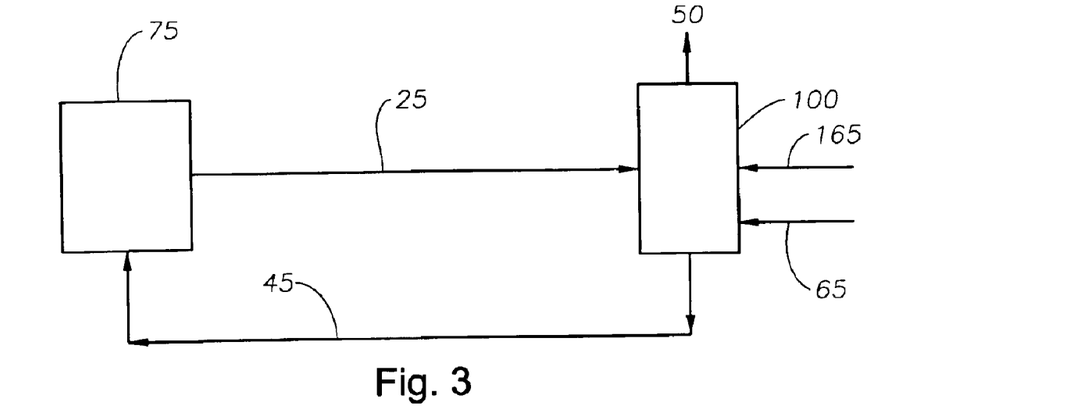
FIG. 3 is a simplified flow diagram that shows a method for obtaining and storing a substantially contaminant free seedbed in accordance with an embodiment of this invention.

Referring to FIG. 3, in an embodiment, the polymer product is discharged from the reactor 75 during normal operations and is transferred through line 25 directly to the seedbed container 100. An inert gas purging system 165, such as a nitrogen and water purge system, is used to remove reactants from the seedbed and deactivate catalyst species. The seedbed can be stored in the container 100 under an inert gas blanket provided from an inert gas system 65. When needed, the seedbed can be transferred to the reactor 75 by way of transfer line 45.

Figure 4:
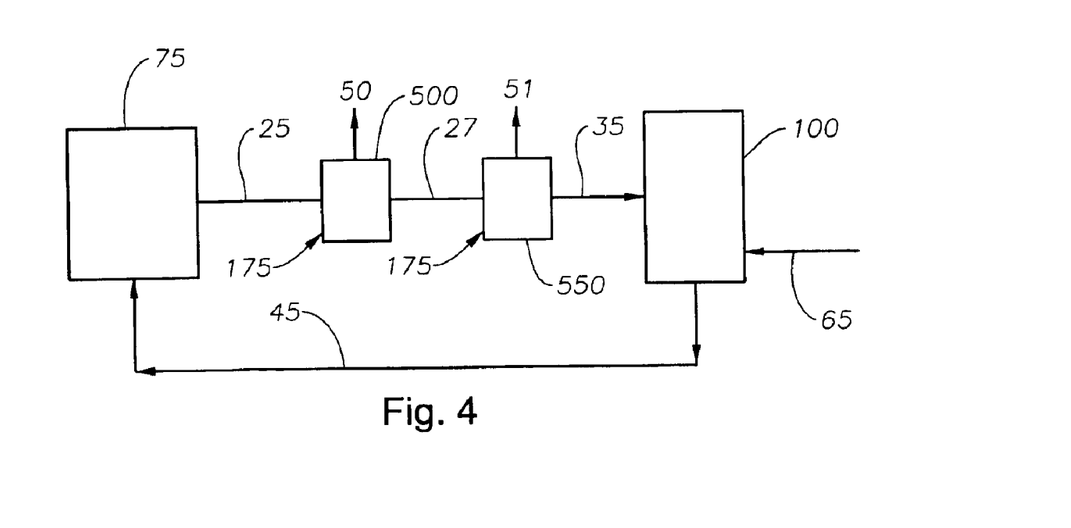
FIG. 4 is a simplified flow diagram that shows a method for obtaining and storing a substantially contaminant free seedbed in accordance with an embodiment of this invention.

Referring now to FIG. 4, in another embodiment, the polymer product is discharged from the reactor 75 during normal operations and is transferred through transfer line 25 to a stripping and venting unit 500 equipped with vent 50, wherein the reactants are stripped and/or vented from the product, and wherein either in the stripping and venting unit 500 or, after transfer by way of transfer line 27, preferably in a deactivation unit 550 equipped with vent 51, catalyst species contained with the product particles are deactivated without introducing substantial contaminants to the product such as, for example, by injecting a combination of steam and dry nitrogen from a deactivation system 175 at a sufficient amount to deactivate any active catalyst species but not at an excess amount such that the moisture or other suitable deactivator is available to act as a catalyst killer or contaminant in a subsequent polymerization. Thereafter the substantially contaminant free seedbed material is transferred by way of transfer line 35 to a storage container 100 wherein a pad or blanket of inert gas is provided from an inert gas system 65 to maintain the seedbed substantially free of contaminants. The seedbed is ready for subsequent introduction into the reactor through transfer line 45, without the need for purging before or after introduction into the reactor 75. The transfer should be conducted to prevent the introduction of additional or substantial contaminants to the seedbed and the reactor 75. Preferably, the transfer (which may be either at dilute phase or dense phase) is accomplished using a dry inert gas such as nitrogen.

By the term "stripping and venting" it is meant that reactants are completely or substantially removed or separated from polymer product and allowed to escape unit 500 as a result of a pressure drop (that is, there is a sufficiently reduced pressure to separate gases and any liquids from solid polymer particles) in unit 500, including the application of a vacuum. By complete or substantial removal or separation of reactants from polymer product it is meant that the lower explosive limit (LEL) is in the range of 0–5% in unit 500. The pressure drop or vacuum can be accomplished by any suitable means known in the art including by employing extrusion values and vacuum pumps.

Figure 5:
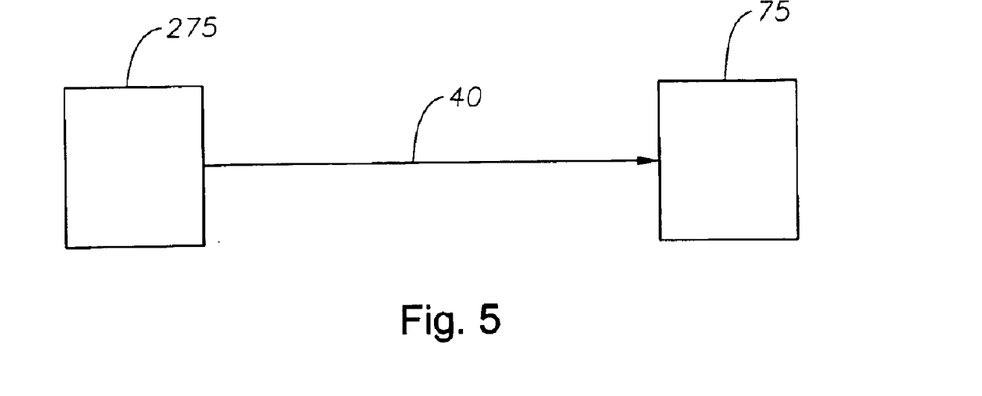
FIG. 5 is a simplified flow diagram that shows a method for obtaining a substantially contaminant free seedbed in accordance with an embodiment of this invention.

Referring now to FIG. 5, in yet another embodiment, the seedbed is provided directly into the reactor 75 from another polymerization reactor, while at the same time preventing the introduction of additional or substantial contaminants. For example, it is contemplated that the seedbed can be provided directly from a second reactor 275 through a line or system of lines 40 connecting the reactors, provided the lines or system of lines 40 are in a substantially closed system. Although such a transfer is possible, it is less preferred because of scheduling and logistical difficulties.

The storage container 100 is preferably a vertical storage bin capable of being sealed to be air-tight, although any appropriate container may be used, such as hopper cars, semi-bulk bags and drums. The seedbed can be stored in the storage container 100 under a blanket of inert gas 55 to maintain the seedbed 10 substantially free of contaminants for introduction into the reactor 75.

Again referring to FIG. 1, in a preferred embodiment, to introduce a substantially contaminant free seedbed into the reactor, a seedbed conveying line 45 is used to transfer the seedbed from the container 100 to the reactor 75. The seedbed conveying line 45 can either be permanently attached to the reactor 75, or can be detachable, for example by way of a pipe connecting spool. Connection of the conveying line 45 and the reactor 75 is made at a seedbed fill point 15.

Figure 6:
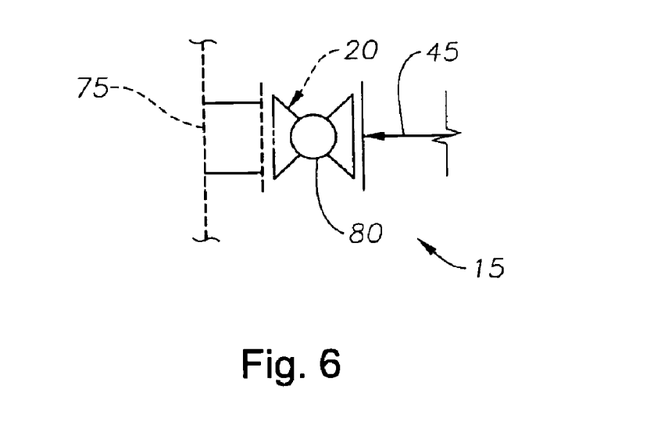
FIG. 6 illustrates a mechanism by which a seedbed conveyance line can be attached to the reactor during polymerization.

When the seedbed conveying line 45 is attached to the reactor 75 during polymerization, the seedbed conveying line 45 should be continuously purged to prevent polymers or reactants from depositing in the conveying line 45, or the conveying line 45 should be purged prior to introducing the substantially contaminant free seedbed into the reactor to remove any polymers or reactants previously deposited in the conveying line 45, and/or, boss nozzles may be utilized to minimize or prevent excessive quantities of product from being deposited in conveying lines. For example, referring to FIG. 6, a slipstream 20 of reactor circulating gas can be continuously introduced into conveying line 45 near the reactor and be circulated back into the reactor 75 to keep actively-growing catalyst/polymer particles from being deposited in the conveying line 45. Other purge streams can be used, however, it is more favorable to use a purge stream whose composition does not negatively impact the polymerization reaction. It is also preferable to keep the seedbed conveying line 45 attached to the reactor 75 to help minimize operations and maintenance effort to refill the reactor 75. A valve 80, such as a full port valve, can be positioned near the reactor end of the seedbed conveying line 45 to accomplish the isolation of the reactor 75 from the container 100 during normal reactor operation.

Figure 7:
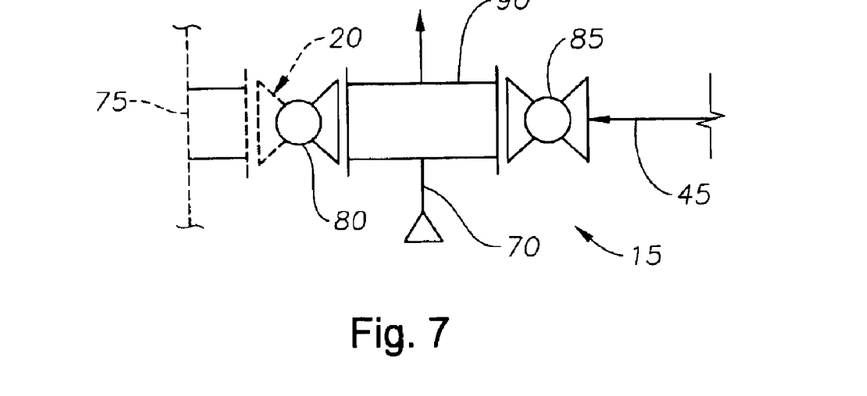
FIG. 7 illustrates a mechanism by which a seedbed conveyance line can be detachable from the reactor during polymerization, but attached to the reactor for conveyance of the seedbed.

Instead of being permanently attached to the reactor 75, the seedbed conveying line 45 may also be detached from the reactor 75 when the line is not being used to transfer the seedbed. Referring to FIG. 7, in this embodiment, a vent valve 85 can be positioned on the seedbed conveying line 45 near the inlet of the valve 80, with a pipe connecting spool 90 connecting the valve 80 and vent valve 85. The pipe connecting spool 90 is removable upon closing of both valve 80 and vent valve 85. Prior to transferring the seedbed, the connecting spool 90 can be attached, and the seedbed conveying line 45 and connecting spool purged (with valve 80 closed) with an inert gas, such as nitrogen from source 70, to ensure no contaminants are introduced into the reactor 75 during the seedbed transfer.

Although in FIG. 1, the seedbed fill point 15 is illustrated as being located on the cylindrical portion of the reactor 75, it is not intended to limit the scope of the invention as such. The positioning of the seedbed fill point 15 in relation to the reactor 75 can be selected by one of ordinary skill in the art. For example, the seedbed fill point 15 can also be conveniently located, among other places, near the dome of the reactor 75, for example at fill point 130 or into an existing transfer line.

The delivery of the seedbed 10 to the reactor 75 can be accomplished by any common method, provided that the seedbed 10 is delivered to the reactor 75 at a final pressure in excess of the pressure being maintained in the reactor during this filling or introduction step. For example, the seedbed can be transferred into the reactor by suction, aspiration or by blowing the seedbed into the reactor under pressure by inert gas. Zero reactor pressure during filling with the seedbed 10 is possible, however, a slight positive pressure in the reactor 75 is preferred to help avoid the potential ingress of air and/or moisture. In this regard, the reactor may be opened to the atmosphere provided the reactor is maintained at a sufficient pressure to prevent intrusion of contaminants, i.e. the system is still substantially closed.

Dense-phase inert gas can be used as a carrier to transfer the seedbed 10 from the container 100 to the reactor 75, through the conveyance line 45. Referring again to FIG. 1, commonly known transfer equipment 110 such as a blow-tank system or a rotary feeder that is rated for the required pressure differential may be used. Dilute-phase inert gas delivery can also be used as long as it delivers the seedbed 10 to the reactor 75 at pressures in excess of the reactor pressure during filling. Transfer equipment 110 such as a standard rotary feeder based delivery system can also be used for the dilute-phase system. Other options include using a gravity-flow delivery system for high discharge rates from the storage container, positioned above the gas-phase reactor fill port. In each of these systems, the reactor 75 may be equipped with a vent 50 to flare to accommodate the addition of the seedbed under pressure.

The transfer rate of the seedbed 10 to the reactor 75 can be selected based on the desired reactor fill time. The volumetric inert gas flow requirement for the transfer can be adjusted to maintain the proper gas/solids ratio. A preferred solids/gas mass ratio is in the 1–10:1 range for dilute phase and greater than 25:1 for dense phase. The inert gas velocity at the seedbed pick-up point for dilute gas phase would nominally be in the 20–40 meters/second (m/s) range and, more typically, in the 25–30 m/s range.

The feed system for the next polymerization reaction, e.g. monomer (or comonomer) and hydrogen, is introduced into the reactor after introduction of the seedbed. The concentrations of monomer, comonomer and hydrogen are selected by one of ordinary skill in the art based upon the second catalyst system to be introduced into the reactor. After the desired process conditions in the reactor are obtained and the seedbed is fluidized, the second catalyst can be introduced to begin the second polymerization reaction.

It should be recognized that this invention also contemplates using one or more additional storage containers, each container having a substantially contaminant free seedbed, as described above, to supply to the reactor 75 for the transition between incompatible catalysts as previously described. Preferably, storage containers are provided with stored seedbed polymer therein for each polymer product that the polymer manufacturer is to make in its polymerization operations.

An important aspect to this invention is to provide a fast "running" or "flying" transition from one catalyst to a second catalyst in a gas-phase polymerization system, while minimizing the amount of second catalyst-produced off-grade product. Preferably, the reactor down-time, that is the time between the removal of the first catalyst to the introduction of the second catalyst, is less than 48 hours, more preferably, less than 24 hours.

EXAMPLE

The following is a prophetic example of a transition from a titanium-based Ziegler-Natta catalyst to a bisCp metallocene catalyst in a gas-phase reactor, using the process of this invention. This example is meant to provide a better understanding of the present invention. However, it should be understood that the invention is not intended to be limited in any way to the specific details of the example.

1. Capture a seedbed of sufficient volume, remove reactants from the seedbed, and deactivate catalyst species contained with the seedbed to obtain a substantially contaminant free seedbed and store the seedbed in a storage container under an inert gas blanket to maintain the seedbed as substantially contaminant free.
2. Stop the Ziegler-Natta catalyst feed to the reactor.
3. Inject carbon monoxide, a catalyst kill agent, into the reactor.
4. Confirm that the reaction has terminated, for example by measuring the temperature change in the reactor.
5. Feed nitrogen into the reactor to displace hydrocarbons.
6. Inject carbon dioxide kill agent into the reactor and circulate.
7. Empty the reactor bed contents produced with the first catalyst through the normal reactor discharge system
8. Pressure purge the reactor (with nitrogen) of hydrocarbons after the lower explosive limit (LEL) drops below 10%.
9. Confirm that the seedbed atmosphere does not contain oxygen via an oxygen analyzer.
10. Open the reactor valves to the flare header.
11. Begin seedbed fill after the reactor attains a 0% LEL.
12. Initiate pressure-conveying transfer of the seedbed from its pre-purged storage location into the reactor (after reactor attains a 0% LEL). Continue the conveying until the procedural mass of resin has been transferred into the reactor.
13. Shut down the conveying operation and re-isolate the reactor system from the seedbed transfer system.
14. Pressurize the reactor with nitrogen to perform leak check.
15. Use a moisture analyzer to confirm the absence of moisture in the reactor.
16. Heat the reactor to the second catalyst set point.
17. Re-establish reactor target concentrations for feed streams.
18. Start feeding the second catalyst into the reactor.

We claim:

1. A process for transitioning from a first polymerization reaction using a first catalyst system to produce a first polymerization product to a second polymerization reaction producing a second polymerization product wherein the second polymerization reaction is incompatible with the first polymerization catalyst system or first polymerization product in a gas-phase reactor, comprising:

(a) after the first polymerization reaction, conducting multiple polymerization reactions in the gas-phase reactor using multiple polymerization catalyst systems, multiple reactor conditions and/or multiple feed streams to form multiple polymerization products;

(b) forming a substantially contaminant-free seedbed from each polymerization reaction by removing a portion of the polymerization product from each polymerization reaction and stripping or venting reactants and contaminants from each polymerization product;

(c) deactivating catalyst species entrained or contained with each polymerization product without contacting the polymerization product with excess deactivator;

(d) optionally, after the deactivation step, stripping or venting reactants and contaminants from each polymerization product;

(e) storing each substantially contaminant-free seedbed separately in a storage container under dry inert atmosphere to maintain each seed bed as substantially-free of contaminants;

(f) stopping each multiple polymerization reaction;

(g) removing the contents of each multiple polymerization reaction from the gas-phase reactor while preventing the introduction of additional or substantial contaminants;

(h) selecting a stored substantially contaminant-free seedbed that is compatible with the second polymerization reaction in regards to polymerization product or polymerization catalyst system;

(i) introducing the selected substantially contaminant-free seedbed into the gas-phase reactor while preventing the introduction of additional or substantial contaminants to the seedbed and reactor;

(j) introducing a second feed system into the gas-phase reactor;

(k) introducing a second catalyst system into the gas-phase reactor; and (l) conducting the second polymerization reaction.

2. The process of claim 1, wherein each multiple or the first polymerization catalyst system comprises a Ziegler-Natta catalyst system, and the second polymerization catalyst system comprises a metallocene catalyst component.

3. The process of claim 1, wherein the step of removing the contents of each multiple or the first polymerization system comprises removing greater than 95% by volume of the reactor contents through a discharge outlet.

4. The process of claim 1, wherein the step of stopping each multiple or the first polymerization reaction comprises adding a catalyst killer to the first polymerization reaction.

5. The process of claim 1, wherein each substantially contaminant free seedbed comprises less than 100 parts per million of contaminants.

6. The process of claim 1, wherein the stripping or venting of reactants and the deactivation of catalyst species are accomplished in separate process units or equipment.

7. The process of claim 1, wherein the reactor is maintained as a substantially closed system during the introduction of the selected substantially contaminant-free seedbed.

8. The process of claim 1, wherein the reactor is maintained as a substantially closed system during removal of product from each multiple or the first polymerization reaction and during the introduction of the selected substantially contaminant-free seedbed by not opening the reactor to the atmosphere.

9. The process of claim 1, wherein the reactor is maintained as a substantially closed system during removal of product from each multiple or the first polymerization reaction and during the introduction of the selected substantially contaminant-free seedbed by providing sufficient pressure in the reactor to prevent entry of contaminants from the atmosphere.

10. The process of claim 1, wherein the reactor is maintained as a substantially closed system during removal of product from each multiple or the first polymerization reaction and during the introduction of the substantially contaminant-free seedbed by using at least one condensing inducing agent in an amount greater than or equal to 20 percent by volume in the reactor.

11. The process of claim 1, wherein at least one of each multiple polymerization reaction, the first polymerization reaction or the second polymerization reaction is conducted in condensing mode.

12. The process of claim 1, wherein each multiple polymerization reaction, the first polymerization reaction and the second polymerization reaction are conducted in condensing mode.

13. The process of claim 11 or 12, wherein a condensing inducing agent is used.

14. The process of claim 10 or 13, wherein the condensing inducing agent is isopentane.

15. The process of claim 1, wherein steps (a) through (e) are conducted continuously, without interruption until sufficient quantities of each substantially contaminant-free seed bed are stored for the second polymerization.

16. The process of claim 1, wherein step (d) is performed following step (c) or steps (b) and (c) are performed simultaneously and step (d) is not performed.

17. The process of claim 1, wherein the second polymerization comprises the first polymerization catalyst.

18. The process of claim 1, wherein the second polymerization comprises the first polymerization product.

* * * * *